United States Patent [19]
Morisawa et al.

[11] Patent Number: 5,904,631
[45] Date of Patent: May 18, 1999

[54] DUAL ELECTRIC MOTOR DRIVE WITH PLANETARY GEARING

[75] Inventors: Kunio Morisawa, Toyota; Yutaka Taga, Aichi-ken; Shuji Nagano, Toyota; Hideaki Matsui, Aichi-ken, all of Japan

[73] Assignee: Toyota Jidosha Kabushiki Kaisha, Toyota, Japan

[21] Appl. No.: 08/825,615

[22] Filed: Mar. 31, 1997

[30] Foreign Application Priority Data

Aug. 13, 1996 [JP] Japan .................................. 8-232614

[51] Int. Cl.⁶ ...................................................... B60K 6/00
[52] U.S. Cl. .............................................................. 475/5
[58] Field of Search ......................................... 475/5, 10

[56] References Cited

FOREIGN PATENT DOCUMENTS

A 4124479  1/1993  Germany .
50-30223  3/1975  Japan .

*Primary Examiner*—Dirk Wright
*Attorney, Agent, or Firm*—Oliff & Berridge, PLC

[57] ABSTRACT

A power output apparatus (100) includes an engine (102), a double-pinion planetary gear (110), a first motor (MG1), and a second motor (MG2). A ring gear (114), a planetary carrier (126), and a sun gear (112) of the double-pinion planetary gear (110) are respectively linked with a crankshaft (104) of the engine (102), a drive shaft (108), and the first motor (MG1). The engine (102), the second motor (MG2), the double-pinion planetary gear (110), and the first motor (MG1) are arranged sequentially along an axis running from the front to the rear of a vehicle. The second motor (MG2) is required to output a greater torque than that of the first motor (MG1) and accordingly has a larger size. The second motor (MG2) is, however, disposed closer to the engine (102) and thereby has a sufficient margin in the diametral direction. This configuration reduces the size of the whole power output apparatus (100).

10 Claims, 7 Drawing Sheets

DUAL ELECTRIC MOTOR DRIVE WITH PLANETARY GEARING

BACKGROUND OF THE INVENTION

1. Field of the Invention

The present invention relates to a power output apparatus, and more specifically to a power output apparatus for outputting power to a drive shaft.

2. Description of the Prior Art

Known power output apparatuses for carrying out torque conversion of power output from an engine and outputting the converted power to a drive shaft include a combination of a fluid-based torque converter with a speed change gear. In the torque converter, an input shaft and an output shaft of the power are not fully locked. This causes a slip between the input shaft and the output shaft and leads to an energy loss corresponding to the slip. The energy loss is expressed as the product of the revolving speed difference between the input shaft and the output shaft and the torque transmitted to the output shaft and is consumed as heat.

In a vehicle having such a power output apparatus mounted thereon as its power source, at the time when significantly large power is required, for example, at the time of starting the vehicle or running the vehicle on an upward slope at a low speed, a large energy loss in the torque converter undesirably lowers the energy efficiency. Even in a stationary driving state, the efficiency of power transmission in the torque converter is not 100%, and the fuel consumption rate in the known power output apparatus is thereby lower than that in a manual transmission.

In order to solve such problems, the applicants have proposed a system that does not include the fluid-based torque converter but has an engine, a planetary gear, two motors, and a battery and regulates the power output from the engine with the planetary gear and the two motors, so as to output the regulated power to the drive shaft (JAPANESE PATENT LAYING-OPEN GAZETTE No. 50-30223). In this reference, however, there is substantially no specification regarding the configuration of the respective constituents when the system is installed in a limited space, such as a vehicle or a ship.

SUMMARY OF THE INVENTION

One object of the present invention is thus to provide a power output apparatus that can output power from an engine to a drive shaft with a high efficiency.

Another object of the present invention is to realize an efficient configuration of the respective constituents of a power output apparatus installed in a limited space.

Still another object of the present invention is to reduce the size of the whole power output apparatus.

At least part of the above and the other related objects is realized by a power output apparatus for outputting power to a drive shaft of the present invention, the power output apparatus comprises: an engine having an output shaft; a first motor for transmitting and receiving power to and from a first rotating shaft; a second motor for transmitting and receiving power to and from a second rotating shaft linked with the drive shaft; and three shaft-type power input/output means having three shafts respectively linked with the output shaft, the drive shaft, and the first rotating shaft, the three shaft-type power input/output means determining power input to and output from a residual one shaft based on predetermined powers input to and output from any two shafts among the three shafts, wherein the output shaft of the engine, the drive shaft, the first rotating shaft, and the second rotating shaft are arranged coaxially, the engine, the second motor, the three shaft-type power input/output means, and the first motor being arranged in this sequence.

In the power output apparatus of the present invention, the second motor that is larger in size than the first motor is placed near the engine. This configuration enhances the consistency in the structure of the power output apparatus and allows the power output apparatus to be readily installed in a limited space.

The power output apparatus of the present invention includes three shaft-type power input/output means, which has three shafts respectively linked with the output shaft of the engine, the drive shaft, and the first rotating shaft of the first motor. When powers are input to and output from any two shafts among these three shafts, the three shaft-type power input/output means inputs and outputs power, which is determined according to the input and output powers, to and from a residual one shaft. Namely the power input to and output from the drive shaft can be regulated by regulating the power output from the engine and the power input to and output from the first motor. The second motor inputs and outputs the power to and from the drive shaft via the second rotating shaft linked with the drive shaft. The drive shaft accordingly receives the power input and output via the three shaft-type power input/output means as well as the power input to and output from the second motor.

In accordance with one aspect of the power output apparatus of the present invention; wherein the three shaft-type power input/output means is structured as a double-pinion planetary gear comprising a sun gear, a ring gear, plural pairs of pinion gears, wherein the pinion gears in each pair are linked respectively with the sun gear and the ring gear and connected to each other, and a carrier for rotatably supporting the plural pairs of pinion gears to be coaxial with the sun gear; the output shaft, the first rotating shaft, and the drive shaft being respectively linked with the ring gear, the sun gear, and the carrier.

In accordance with another aspect of the power output apparatus of the present invention, the power output apparatus further comprises a reduction gear attached to the second rotating shaft. This structure enables the reduction gear to carry out the torque conversion of the power output from the second motor, thereby allowing a wider range of motors to be applicable for the second motor. In this structure, wherein the reduction gear may be disposed between the second motor and the three shaft-type power input/output means. In this structure, the reduction gear and the three shaft-type power input/output means are placed adjacent to each other. A common supply device of a lubricant can thus be used for the operations of the reduction gear and the three shaft-type power input/output means. This effectively reduces the size of the whole power output apparatus.

DESCRIPTION OF THE PREFERRED EMBODIMENT

Figure 1:
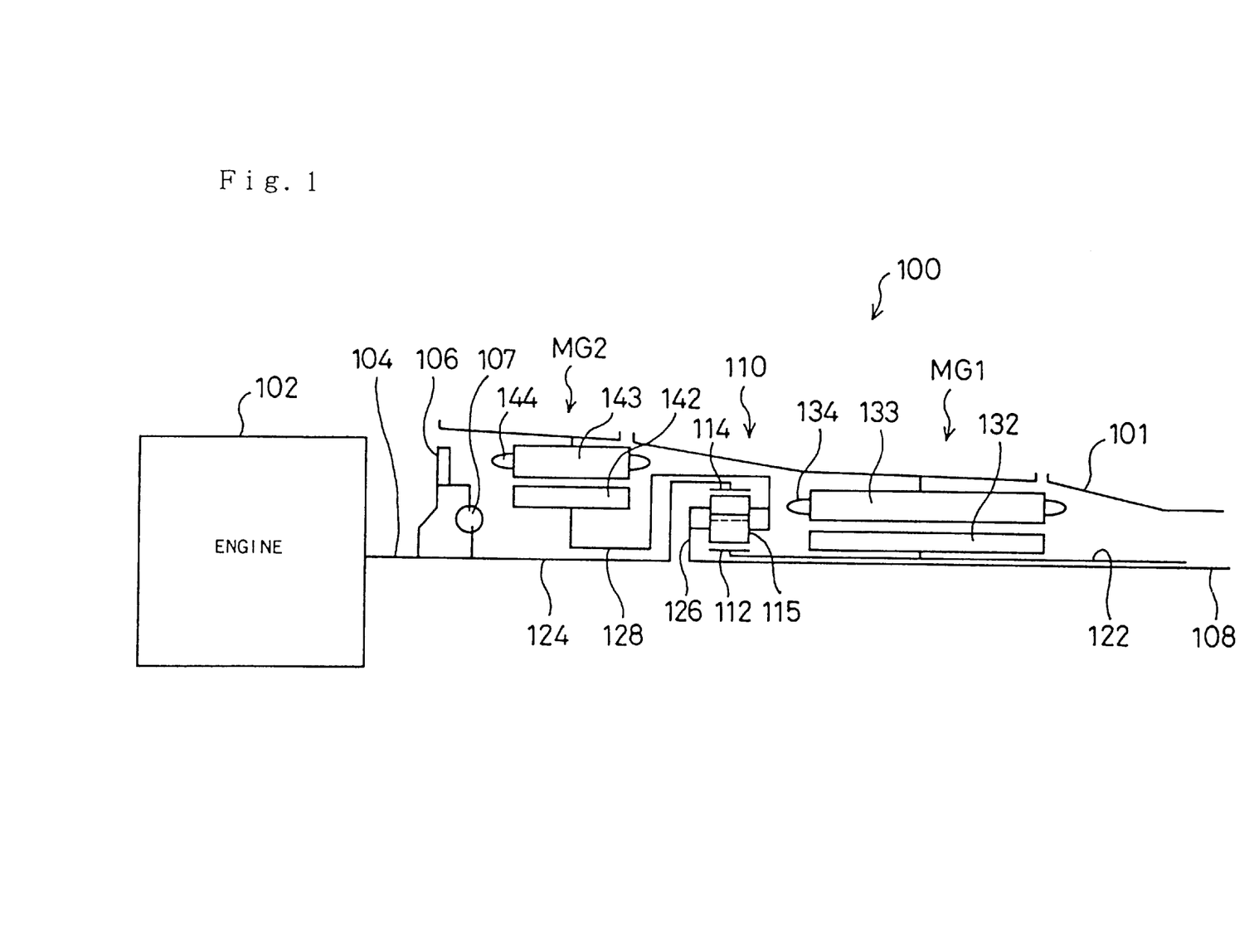
FIG. 1 shows a configuration of a power output apparatus 100 mounted on a vehicle as a first embodiment according to the present invention.
Figure 2:
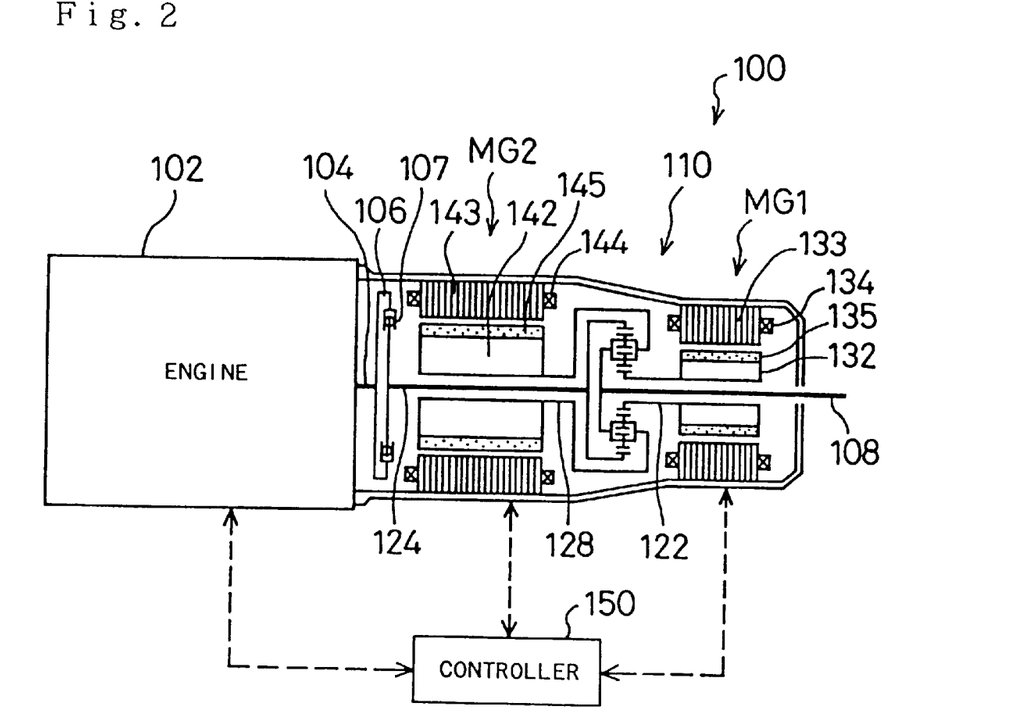
FIG. 2 is a block diagram schematically illustrating structure of the power output apparatus 100 of the first embodiment.
Figure 3:
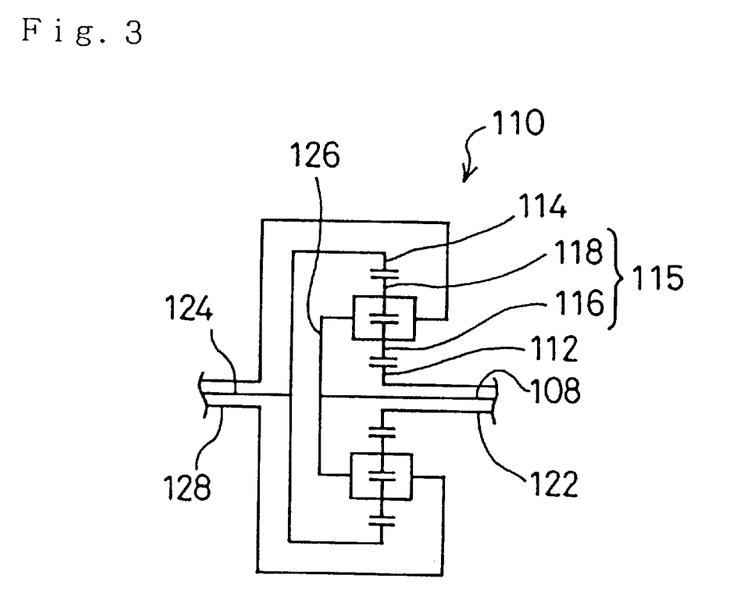
FIG. 3 shows structure of a double-pinion planetary gear 110 included in the power output apparatus 100 of the embodiment.

Some modes of carrying out the present invention are described as preferred embodiments. FIG. 1 shows a configuration of a power output apparatus 100 mounted on a vehicle as a first embodiment according to the present invention; FIG. 2 is a block diagram schematically illustrating structure of the power output apparatus 100 of the first embodiment; and FIG. 3 shows structure of a double-pinion planetary gear 110 included in the power output apparatus 100 of the embodiment. As a matter of convenience, the configuration of the power output apparatus 100 of the first embodiment mounted on the vehicle is discussed with the drawing of FIG. 1, after the explanation of the structure of the power output apparatus 100 with the drawings of FIGS. 2 and 3.

Referring to FIGS. 2 and 3, the power output apparatus 100 of the first embodiment mainly includes an engines 102 driven by gasoline as a fuel, a double-pinion planetary gear 110 having a ring gear 114 mechanically linked with a crankshaft 104 of the engine 102, a first motor MG1 connecting with a sun gear 112 of the double-pinion planetary gear 110, a second motor MG2 connecting with a planetary carrier 126 of the double-pinion planetary gear 110, and a controller 150 for controlling operation of the engine 102 and driving and regulating the first motor MG1 and the second motor MG2.

As shown in FIGS. 2 and 3, the double-pinion planetary gear 110 includes: the sun gear 112 linked with a hollow sun gear shaft 122 which a drive shaft 108 passes through; the ring gear 114 linked with the crankshaft 104, which is coaxial with the drive shaft 108, via a flywheel 106, a damper 107, and a ring gear shaft 124; plural pairs of planetary pinion gears 116 and 118 arranged between the sun gear 112 and the ring gear 114 (each pair of planetary pinion gears 116 and 118 is hereinafter referred to as the 'double-pinion gear 115'); and the planetary carrier 126 connecting with one end of the drive shaft 108 to support the rotating shafts of the double-pinion gear 115 and linked with a carrier shaft 128 via the double-pinion gear 115. One planetary pinion gear 116 in each pair is linked with the sun gear 112 while the other 118 is linked with the ring gear 114. The pair of planetary pinion gears are linked with each other to revolve around the sun gear 112 while rotating on its axis. In this double-pinion planetary gear 110, the sun gear shaft 122, the ring gear shaft 124, and the drive shaft 108 respectively linked with the sun gear 112, the ring gear 114, and the planetary carrier 126 function as the input and output shafts of the power. Determination of the power input to and output from any two shafts among the three shafts automatically determines the power input to and output from the residual one shaft. The details of the input and output operations of the power to and from the three shafts of the double-pinion planetary gear 110 will be discussed later.

Both the first motor MG1 and the second motor MG2 are constructed as synchronous motor-generators. The motor MG1 (MG2) includes a rotor 132 (142) having a plurality of permanent magnets 135 (145) mounted on the circumferential face thereof and a stator 133 (143) on which three-phase coils 134 (144) generating a revolving magnetic field are wound. The rotor 132 of the first motor MG1 is connected to the sun gear shaft 122 linked with the sun gear 112 of the double-pinion planetary gear 110, whereas the rotor 142 of the second motor MG2 is connected to the carrier shaft 128 linked with the planetary carrier 126 of the double-pinion planetary gear 110.

Although details of the controller 150 are not illustrated, the controller 150 includes two inverter circuits for generating electric currents of quasi-sine waves supplied to the three-phase coils 134 and 144 of the first motor MG1 and the second motor MG2, a battery charged and discharged via the two inverter circuits, a motor control CPU for controlling the switching operations of the two inverter circuits, and an engine control CPU for controlling the operation of the engine 102. The controller 150 receives a variety of signals output from various sensors for measuring the conditions of the first motor MG1, the second motor MG2, and the engine 102, and controls the operations of the first motor MG1, the second motor MG2, and the engine 102 based on these input signals. The control procedure carried out by the controller 150 is not essential for the principle of the present invention and is not specifically discussed here.

The power output apparatus 100 of the first embodiment thus constructed is mounted on a vehicle according to the configuration shown in FIG. 1. Referring to FIG. 1, the engine 102, the second motor MG2, the double-pinion planetary gear 110, and the first motor MG1 included in the power output apparatus 100 are arranged in this sequence along the axis running from the front to the rear of the vehicle. In the drawing of FIG. 1, only the upper half around the crankshaft 104 and the drive shaft 108 is illustrated, since the lower half is a mirror symmetry. A casing 101 in which the second motor MG2, the double-pinion planetary gear 110, and the first motor MG1 is received represents a general space for receiving a fluid-based torque converter and a transmission in a conventional FR-type vehicle. The power output apparatus receivable by the casing 101 can thus be mounted on the conventional vehicle, in place of the torque converter and the transmission. The sizes of the first motor MG1 and the second motor MG2 and their configuration determine whether or not the power output apparatus 100 of the first embodiment is receivable in the fixed space. The sizes of the first motor MG1 and the second motor MG2 depend upon the required performances as the motor or the generator. The degree of freedom of the configuration depends upon the linkage of the double-pinion planetary gear 110 with the three shafts, that is, the sun gear shaft 122, the ring gear shaft 124, and the drive shaft 108. The following describes first the performances required for the first motor MG1 and the second motor MG2 with the operations of the power output apparatus 100 including the double-pinion planetary gear 110 and then the configuration of the first motor MG1 and the second motor MG2.

The power output apparatus 100 of the first embodiment works in the following manner. It is assumed that the engine 102 is driven at a driving point P1 defined by a revolving speed Ne and a torque Te and that the drive shaft 108 is driven at a driving point P2 defined by a revolving speed Nd and a torque Td, which are respectively different from the revolving speed Ne and the torque Te but give an identical energy to an energy Pe output from the engine 102. Namely the power output from the engine 102 is subjected to a torque conversion before being applied to the drive shaft 108.

Figure 4:
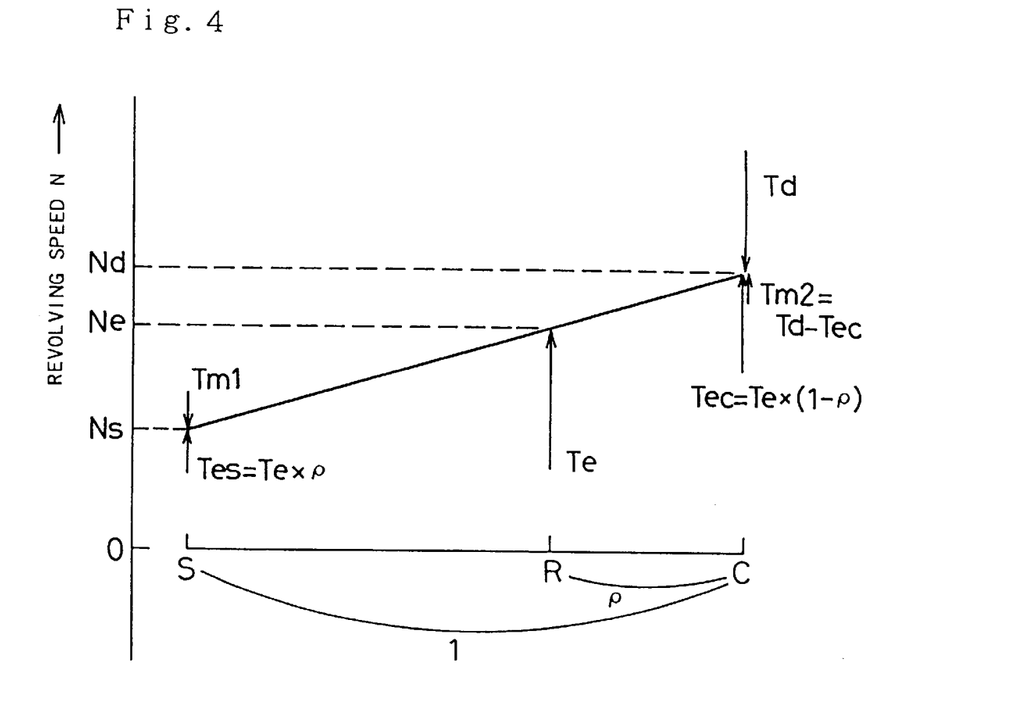
FIG. 4 is a nomogram showing the relationship between the revolving speed and the torque on the three shafts linked with the double-pinion planetary gear 110.
Figure 5:
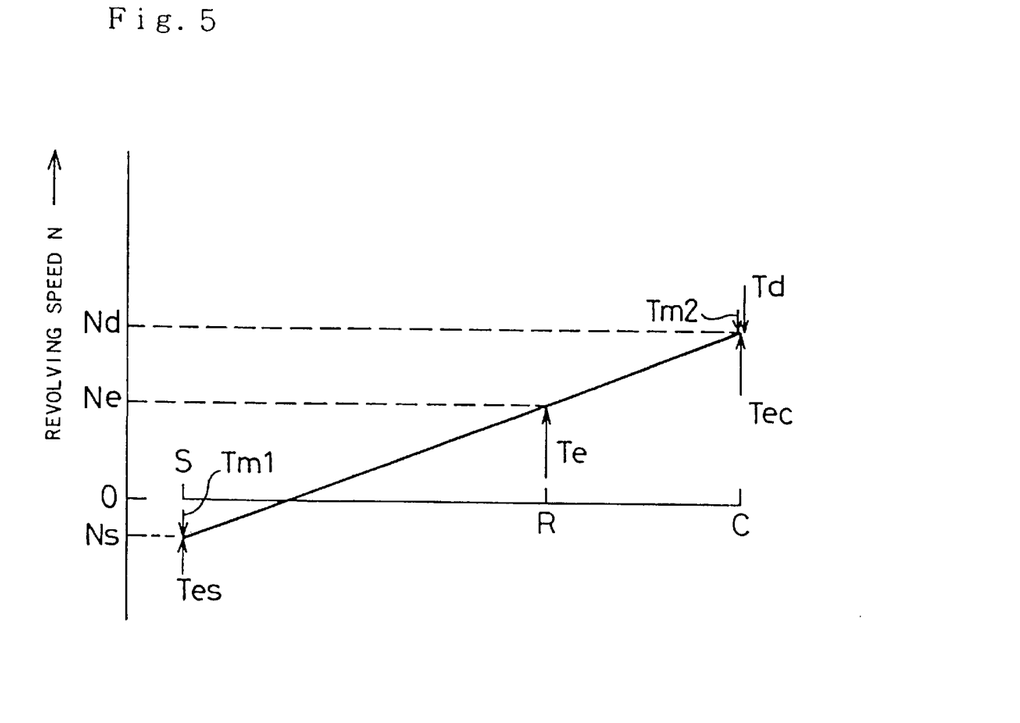
FIG. 5 is a nomogram showing the relationship between the revolving speed and the torque on the three shafts linked with the double-pinion planetary gear 110.

According to the mechanics, the relationship between the revolving speed and the torque on the three shafts in the double-pinion planetary gear 110 (that is, the sun gear shaft 122, the ring gear shaft 124, and the drive shaft 108) can be expressed as nomograms illustrated in FIGS. 4 and 5 and solved geometrically. The relationship between the revolving speed and the torque on the three shafts in the double-pinion planetary gear 110 may be analyzed numerically through calculation of energies of the respective shafts, without using the nomograms. For the clarity of explanation, however, the nomograms are used in this embodiment.

In the nomogram of FIG. 4, the revolving speed of the three shafts is plotted as ordinate and the positional ratio of the coordinate axes of the three shafts as abscissa. When coordinate axes S and R respectively represent the sun gear shaft 122 and the ring gear shaft 124, a coordinate axis C of the drive shaft 108 is given as an exterior division of the axes S and R at the ratio of 1 to $\rho$, where $\rho$ represents a ratio of the number of teeth of the sun gear 112 to that of the ring gear 114 and expressed as Equation (1) given below:

$$\rho = \text{number of teeth of sun gear/number of teeth of ring gear} \quad (1)$$

As mentioned above, the engine 102 is driven at the revolving speed Ne, while the drive shaft 108 is driven at the revolving speed Nd. The revolving speed Ne of the engine 102 can thus be plotted on the coordinate axis R of the ring gear shaft 124 linked with the crankshaft 104 of the engine 102, and the revolving speed Nd on the coordinate axis C of the drive shaft 108. A straight line passing through both the points is drawn, and a revolving speed Ns of the sun gear shaft 122 is then given as the intersection of this straight line and the coordinate axis S. This straight line is hereinafter referred to as a dynamic collinear line. The revolving speed Ns of the sun gear shaft 122 can be calculated from the revolving speed Ne of the engine 102 and the revolving speed Nd of the drive shaft 108 according to a proportional equation given as Equation (2) below. In the double-pinion planetary gear 110, the determination of the rotations of the two gears among the sun gear 112, the ring gear 114, and the planetary carrier 126 results in automatically setting the rotation of the residual one gear.

$$Ns = Nd - (Nd - Ne)/\rho \quad (2)$$

The torque Te of the engine 102 is then applied upward (in the drawing) to the dynamic collinear line on the coordinate axis R of the ring gear shaft 124 functioning as a line of action. The dynamic collinear line against the torque can be regarded as a rigid body to which a force is applied as a vector. Based on the technique of dividing the force into different lines of action having the same direction, the torque Te acting on the coordinate axis R is divided into a torque Tes on the coordinate axis S and a torque Tee on the coordinate axis C. The magnitudes of the torques Tes and Tee are defined by Equations (3) and (4) below:

$$Tes = Te \times \rho \quad (3)$$

$$Tee = Te \times (1-\rho) \quad (4)$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Tee and the torque that has the same magnitude as but the opposite direction to the torque Td output to the drive shaft 108 is applied to the coordinate axis C. The torque Tm1 is given by the first motor MG1, and the torque Tm2 by the second motor MG2 having the rotor 142 attached to the carrier shaft 128. The first motor MG1 applies the torque Tm1 in reverse of its rotation and thereby works as a generator to regenerate an electrical energy Pm1, which is expressed as the product of the torque Tm1 and the revolving speed Ns, from the sun gear shaft 122. The second motor MG2 applies the torque Tm2 in the direction of its rotation and thereby works as a motor to output an electrical energy Pm2, which is expressed as the product of the torque Tm2 and the revolving speed Nd, as a power to the drive shaft 108 via the carrier shaft 128 and the planetary carrier 126.

In case that the electrical energy Pm1 is identical with the electrical energy Pm2, all the electric power consumed by the second motor MG2 can be regenerated and supplied by the first motor MG1. In order to attain such a state, all the input energy should be output; that is, the energy Pe output from the engine 102 should be equal to an energy Pd output to the drive shaft 108. Namely the energy Pe expressed as the product of the torque Te and the revolving speed Ne is made equal to the energy Pd expressed as the product of the torque Td and the revolving speed Nd.

Although the revolving speed Ns of the sun gear shaft 122 is positive in the nomogram of FIG. 4, it may be negative according to the revolving speed Ne of the engine 102 and the revolving speed Nd of the drive shaft 108 as shown in the nomogram of FIG. 5. In the latter case, the first motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nd, from the carrier shaft 128. In case that the electrical energy Pm1 consumed by the first motor MG1 is made equal to the electrical energy Pm2 regenerated by the second motor MG2 under such conditions, all the electric power consumed by the first motor MG1 can be supplied by the second motor MG2.

The above description refers to the fundamental operation, in which all the power output from the engine 102 is subjected to the torque conversion and output to the drive shaft 108. The power output apparatus 100 of the embodiment can carry out another operation, in which the sum of the power output from the engine 102 and the power based on the electric power discharged from the battery (not shown) included in the controller 150 is output to the drive shaft 108. This operation is realized by setting the torque Tm2 of the second motor MG2 to be greater than the calculated torque (Td-Tee) discussed in FIGS. 4 and 5. This operation enables the power greater than the output power of the engine 102 to be output to the drive shaft 108. A small-sized engine that can output only the power less than the required power is thus applicable for the engine 102. In this case, the performance of the engine 102 is determined by choosing a best combination of the performances of the second motor MG2 and the battery, which attains the highest possible efficiency.

The power output apparatus 100 of the embodiment can also carry out still another operation, in which only the power based on the electric power discharged from the battery is output to the drive shaft 108 while the engine 102 is at a stop. The second motor MG2 directly outputs the power to the drive shaft 108 via the carrier shaft 128 and the planetary carrier 126, in order to realize this operation. In this case, the torque Tm1 of the first motor MG1 is equal to one. This operation enables a drive causing substantially no pollution in areas requiring the stricter environmental protection.

The power output apparatus 100 of the first embodiment can also carry out a variety of other operations. For example, part of the power output from the engine 102 is subjected to the torque conversion and output to the drive shaft 108 while the residual power is regenerated by either the first motor MG1 or the second motor MG2 and used to charge the battery. As another example, all the power output from the engine 102 is regenerated by the first motor MG1 and used to charge the battery while the second motor MG2 keeps the carrier shaft 128 in the locked state. As still another example, the first motor MG1 cranks the engine 102 while the second motor MG2 keeps the carrier shaft 128 in the locked state.

As clearly understood from the description of these various operations, the second motor MG2 is required to have the performance that can drive the vehicle by itself. The second motor MG2 is accordingly greater in size than the first motor MG1, which is required to have the performance that can ensure the balance on the dynamic collinear line and crank the engine 102. The torque output from the motor is proportional to the axial length of the motor as well as to the second power of the diameter of the motor. It is thus preferable that the second motor MG2 is arranged in a place that has a margin in the diametral direction.

The following describes the configuration of the first motor MG1 and the second motor MG2. In case that the double-pinion planetary gear 110 is used as the three shaft-type power input/output means like the power output apparatus 100 of the embodiment, it is desirable that the ring gear shaft 124 connecting with the ring gear 114 is linked with the crankshaft 104 of the engine 102. This is ascribed to the actions on the dynamic collinear lines discussed in FIGS. 4 and 5 as well as to the fact that the power output from the power output apparatus 100 to the drive shaft 108 is mainly generated by the engine 102 and that the engine 102 can not rotate in a reverse direction. When it is assumed that the drive shaft 108, the sun gear shaft 122, the ring gear shaft 124, and the carrier shaft 128 are all coaxial, one possible configuration is the arrangement of the engine 102, the second motor MG2, the double-pinion planetary gear 110, and the first motor MG1 in this sequence, like the power output apparatus 100 of the first embodiment. Other possible configurations include an arrangement of the engine 102, the double-pinion planetary gear 110, the second motor MG2, and the first motor MG1 in this sequence and another arrangement of the engine 102, the second motor MG2, the first motor MG1, and the double-pinion planetary gear 110 in this sequence. The configuration of the power output apparatus 100 of the embodiment shown in FIG. 1, in which the engine 102, the second motor MG2, the double-pinion planetary gear 110, and the first motor MG1 are arranged in this sequence, is advantageous among the possible configurations by taking into account the performance of the second motor MG2 and the shape of the casing 101.

Figure 6:
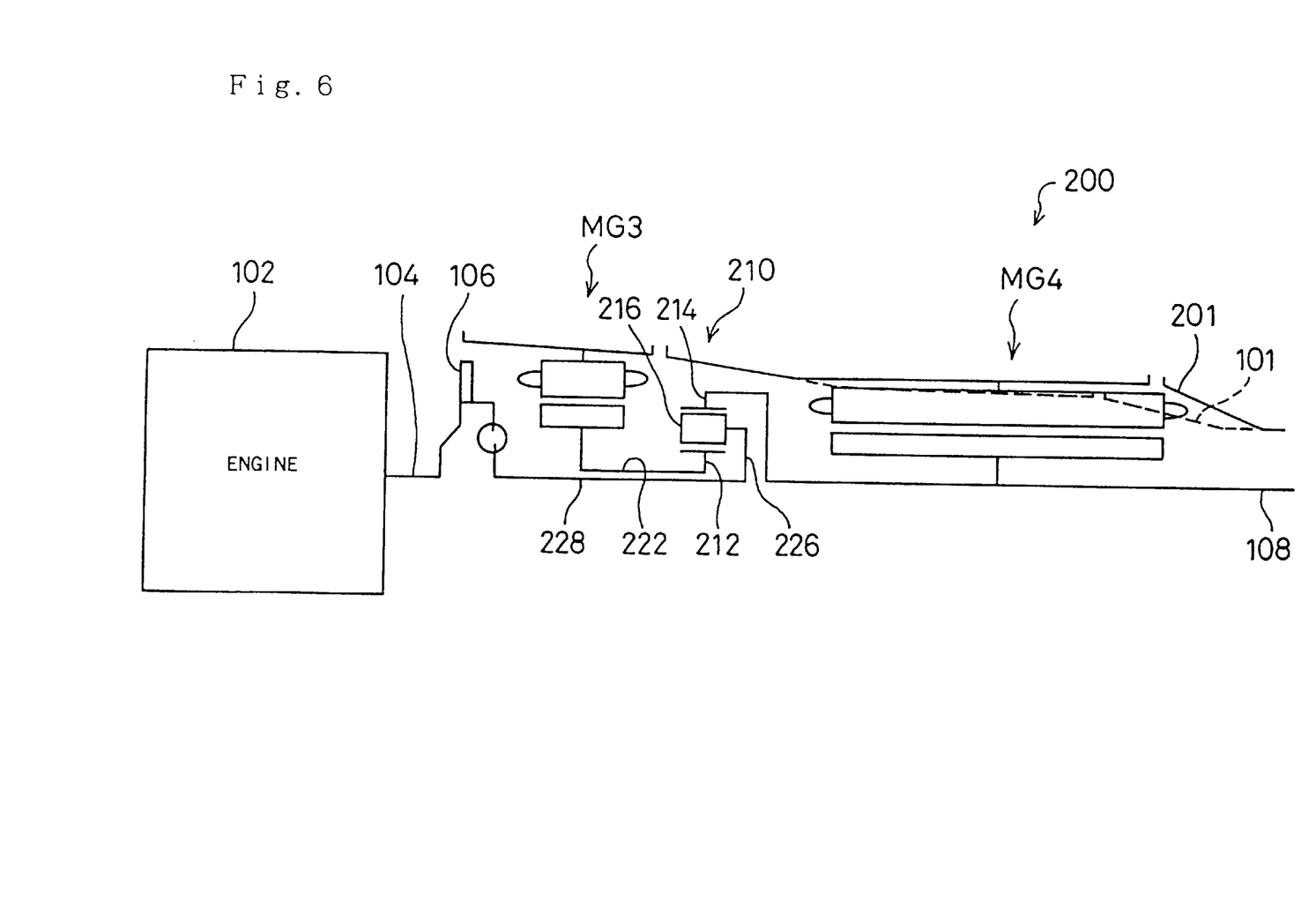
FIG. 6 shows a configuration of a power output apparatus 200 mounted on a vehicle as a comparative example.
Figure 7:
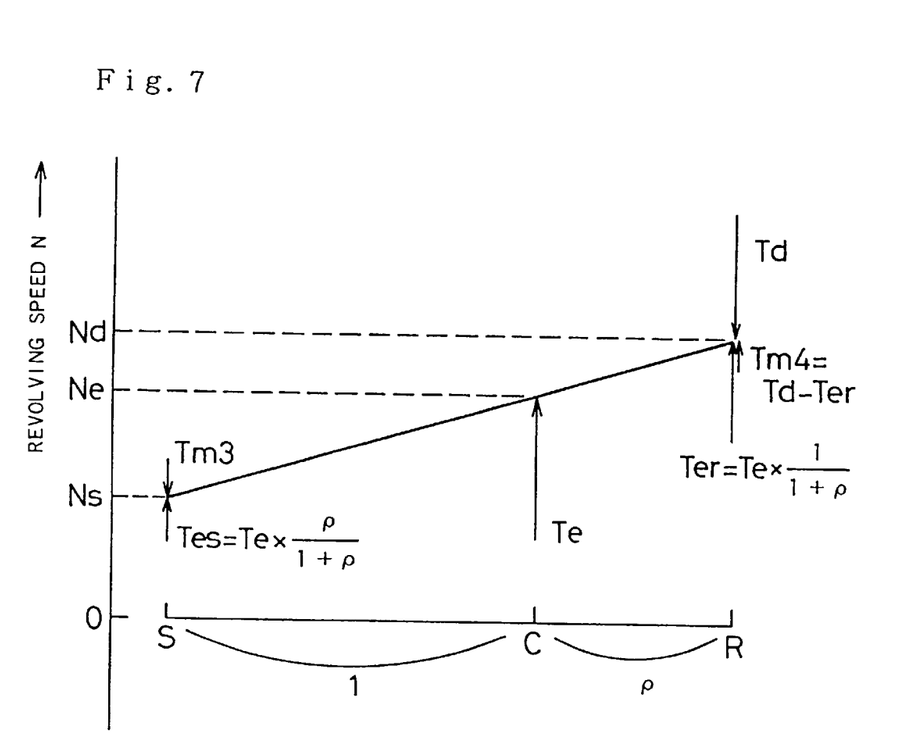
FIG. 7 is a nomogram showing the relationship between the revolving speed and the torque on the three shafts linked with a conventional planetary gear 210 included in the power output apparatus 200 of the comparative example.

In a power output apparatus 200 of FIG. 6 given as a comparative example, a conventional planetary gear 210 having only one planetary pinion gear interposed between the sun gear and the ring gear is used as the three shaft-type power input/output means. FIG. 7 is a nomogram showing the operation of this conventional planetary gear 210. When a coordinate axis S of a sun gear shaft 222 and a coordinate axis R of the drive shaft 108 are positioned on either ends of a line segment, a coordinate axis C of a carrier shaft 228 connecting with a planetary carrier 226 is given as an interior division of the axes S and R at the ratio of 1 to ρ. In this case, it is desirable that the carrier shaft 228 is linked with the crankshaft 104 of the engine 102. When it is assumed that the drive shaft 108, the sun gear shaft 222, and the carrier shaft 228 are all coaxial, possible configurations include an arrangement of the engine 102, a motor MG3 corresponding to the first motor MG1, the planetary gear 210, a motor MG4 corresponding to the second motor MG2 in this sequence like the power output apparatus 200 of the comparative example shown in FIG. 6, another arrangement of the engine 102, the planetary gear 210, the motor MG3, and the motor MG4 in this sequence, and still another arrangement of the engine 102, the motor MG3, the motor MG4, and the planetary gear 210 in this sequence. In the structure of the comparative example using the conventional planetary gear 210, the motor MG4 corresponding to the larger-sized second motor MG2 is placed in a rear portion of the vehicle. A casing 201 is thus required to have a larger space in the rear portion than that of the casing 101. For the comparison, the gear ratio of the planetary gear 210 of the comparative example is set to be identical with the gear ratio of the double-pinion planetary gear 110 of the first embodiment.

The above description proves that the structure of the power output apparatus 100 of the first embodiment, that is, the application of the double-pinion planetary gear 110 as the three shaft-type power input/output means and the configuration of the engine 102, the second motor MG2, the double-pinion planetary gear 110, and the first motor MG1 in this sequence, is advantageous.

The power output apparatus 100 of the first embodiment includes the double-pinion planetary gear 110 as the three shaft-type power input/output means. This structure enables the larger-sized second motor MG2, which is required to output a larger torque among the two motors MG1 and MG2, to be arranged in the place that is closer to the engine 102 and thereby has a sufficient margin in the diametral direction. This enhances the consistency of the configuration in the power output apparatus 100 and enables the power output apparatus 100 to be readily mounted on the vehicle. The power output apparatus 100 can be received in a general space, in which the fluid-based torque converter and the transmission are received in the conventional FR-type vehicle. The power output apparatus 100 of the embodiment can thus be mounted on the vehicle without any modification of the design of the space.

In the power output apparatus 100 of the first embodiment, permanent magnet (PM)-type synchronous motors are used as the first motor MG1 and the second motor MG2. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

Figure 8:
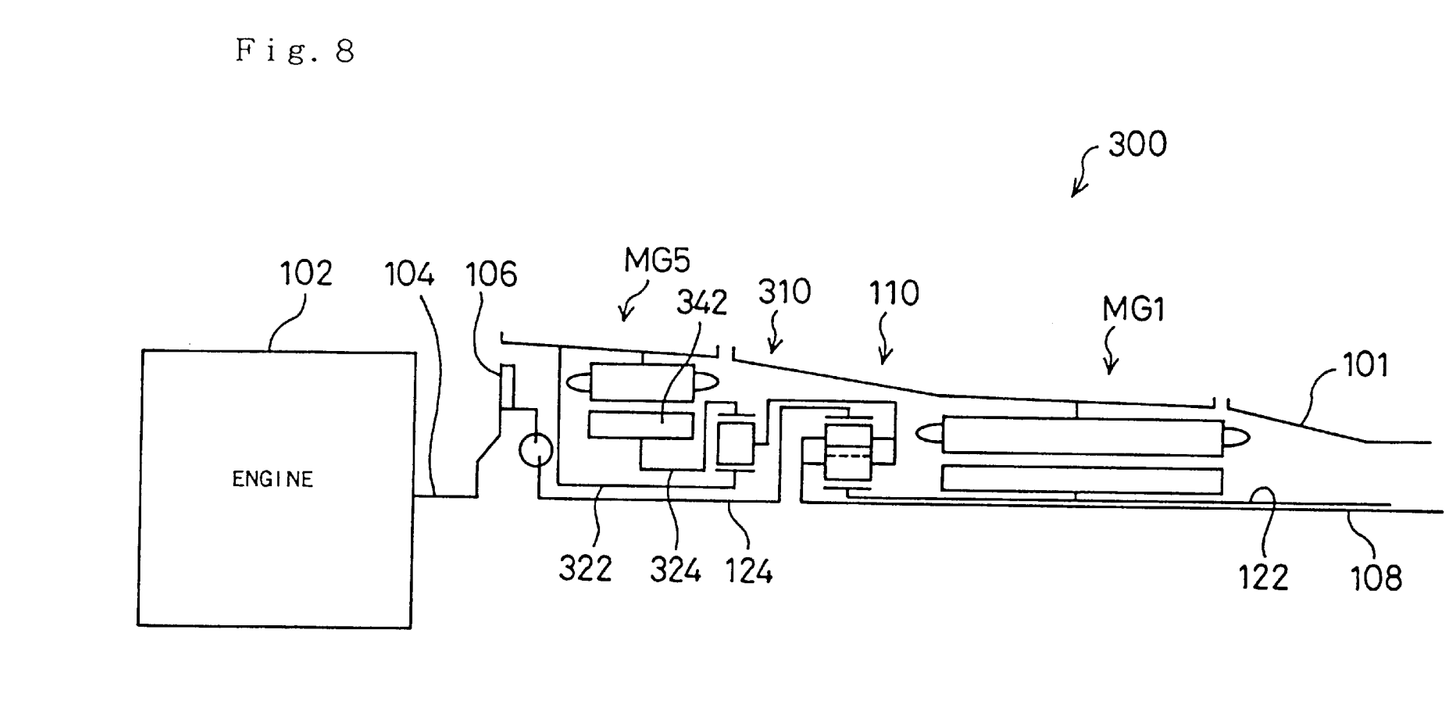
FIG. 8 shows a configuration of a power output apparatus 300 mounted on a vehicle as a second embodiment according to the present invention.
Figure 9:
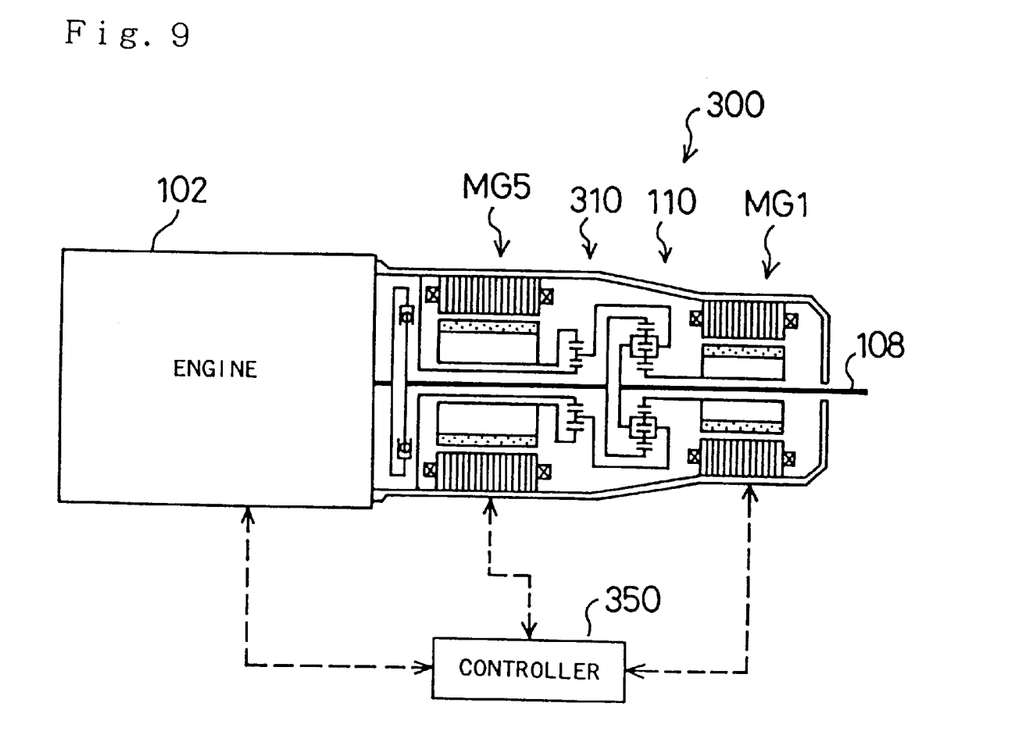
FIG. 9 is a block diagram schematically illustrating structure of the power output apparatus 300 of the second embodiment.
Figure 10:
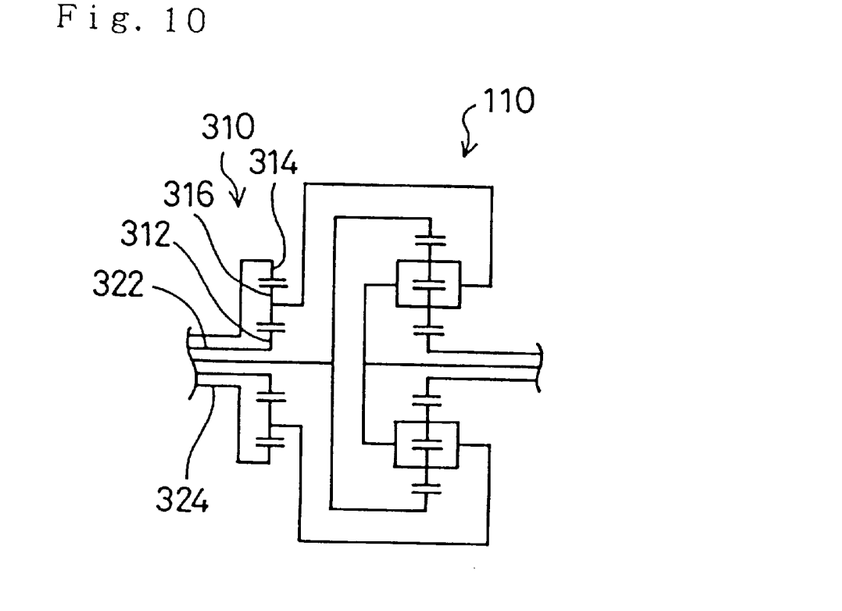
FIG. 10 illustrates structure of a double-pinion planetary gear 110 and a reduction gear 310 included in the power output apparatus 300 of the second embodiment.

Another power output apparatus 300 is described as a second embodiment according to the present invention. FIG. 8 shows a configuration of the power output apparatus 300 of the second embodiment mounted on a vehicle; FIG. 9 is a block diagram schematically illustrating structure of the power output apparatus 300 of the second embodiment; and FIG. 10 illustrates structure of a double-pinion planetary gear 110 and a reduction gear 310 included in the power output apparatus 300 of the second embodiment. The power output apparatus 300 of the second embodiment has a similar structure to that of the power output apparatus 100 of the first embodiment, except that the power output apparatus 300 includes the reduction gear 310 and a motor MG5 in place of the second motor MG2. The same constituents in the power output apparatus 300 of the second embodiment as those in the power output apparatus 100 of the first embodiment are shown by like numerals and symbols and not specifically described here.

The reduction gear 310 included in the power output apparatus 300 of the second embodiment is structured as a planetary gear including a sun gear 312, a ring gear 314, and a planetary pinion gear 316 as shown in FIG. 10. A sun gear shaft 322 fixes the sun gear 312 in the reduction gear 310 to the casing 101 not to allow a rotation of the sun gear 312. The planetary pinion gear 316 in the reduction gear 310 is linked with the carrier shaft 128, which is connected to the planetary carrier 126 via the double-pinion gear 115 of the double-pinion planetary gear 110. The ring gear 314 in the reduction gear 310 is linked with a rotor 342 of the motor MG5 by a ring gear shaft 324. When the gear ratio of the reduction gear 310 constructed as the planetary gear is equal to $\rho$ (=number of teeth of the sun gear/number of teeth of the ring gear), the rotation of the motor MG5 is output as the rotation of $1/(1+\rho)$ to the carrier shaft 128. The torque output from the motor MG5 is accordingly output as the $(1+\rho)$-fold torque to the carrier shaft 128. The required size for the motor MG5 is accordingly smaller than that for the second motor MG2 in the first embodiment. For example, the motor MG5 has a less axial length for the same diameter. The structure of the second embodiment including the reduction gear 310 can thus be received in the casing 101 of the first embodiment.

The power output apparatus 300 of the second embodiment includes the reduction gear 310 disposed between the motor MG5 and the double-pinion planetary gear 110. This structure reduces the size of the motor MG5. The degree of freedom of selection for the motor MG5 can be increased by adjusting the gear ratio of the reduction gear 310. In the power output apparatus 300 of the second embodiment, the reduction gear 310 is placed adjacent to the double-pinion planetary gear 110, so that a common supply device of a lubricant can be used for the reduction gear 310 and the double-pinion planetary gear 110. This structure reduces the size of the whole power output apparatus 300. The power output apparatus 300 of the second embodiment exerts the same effects as those of the power output apparatus 100 of the first embodiment.

The present invention is not restricted to the above embodiments, but there may be many modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A power output apparatus for outputting power to a drive shaft, said power output apparatus comprising:
    an engine having an output shaft;
    a first motor for transmitting and receiving power to and from a first rotating shaft, wherein the first rotating shaft is a central motor shaft of said first motor;
    a second motor for transmitting and receiving power to and from a second rotating shaft linked with said drive shaft; and
    three shaft-type power input/output means having three shafts respectively linked with said output shaft, said drive shaft, and said first rotating shaft, said three shaft-type power input/output means determining power input to and output from a residual one shaft based on predetermined powers input to and output from any two shafts among said three shafts;
        wherein said output shaft of said engine, said drive shaft, said first rotating shaft, and said second rotating shaft are arranged coaxially; and
    wherein said second motor is adjacent said engine, said three shaft-type power input/output means is adjacent said second motor and said first motor is adjacent said three shaft-type power input/output means.

2. A power output apparatus in accordance with claim 1, said power output apparatus further comprising a reduction gear attached to said second rotating shaft.

3. A power output apparatus in accordance with claim 2, wherein said reduction gear is disposed between said second motor and said three shaft-type power input/output means.

4. A power output apparatus in accordance with claim 1, wherein said three shaft-type power input/output means is structured as a double-pinion planetary gear comprising a sun gear, a ring gear, plural pairs of pinion gears, wherein said pinion gears in each pair are linked respectively with said sun gear and said ring gear and connected to each other, and a carrier for rotatably supporting said plural pairs of pinion gears to be coaxial with said sun gear,
    said output shaft, said first rotating shaft, and said drive shaft being respectively linked with said ring gear, said sun gear, and said carrier.

5. A power output apparatus in accordance with claim 4, said power output apparatus further comprising a reduction gear attached to said second rotating shaft.

6. A power output apparatus in accordance with claim 5, wherein said reduction gear is disposed between said second motor and said three shaft-type power input/output means.

7. A power output apparatus in accordance with claim 1, wherein said second motor has a central motor shaft, and wherein said central motor shaft of said second motor is coaxial with said output shaft, said drive shaft, said first rotating shaft and said second rotating shaft.

8. A power output apparatus in accordance with claim 5, wherein said second motor is linked with said carrier by a central motor shaft of said second motor.

9. A power output apparatus in accordance with claim 8, wherein said central motor shaft of said second motor is coaxial with said output shaft, said drive shaft, said first rotating shaft and said second rotating shaft.

10. A power output apparatus for outputting power to a drive shaft, said power output apparatus comprising:
    an engine having an output shaft;
    a first motor for transmitting and receiving power to and from a first rotating shaft;
    a second motor for transmitting and receiving power to and from a second rotating shaft linked with said drive shaft, wherein the second rotating shaft is a central motor shaft of said second motor;
    three shaft-type power input/output means having three shafts respectively linked with said output shaft, said drive shaft, and said first rotating shaft, said three shaft-type power input/output means determining power input to and output from a residual one shaft based on predetermined powers input to and output from any two shafts among said three shafts;

wherein said output shaft of said engine, said drive shaft, said first rotating shaft, and said second rotating shaft are arranged coaxially, and wherein said second motor is adjacent to said engine, said three shaft-type power input/output means is adjacent to said second motor, and said first motor is adjacent to said three shaft-type power input/output means.

* * * * *